US012478974B2

(12) United States Patent
Miller

(10) Patent No.: US 12,478,974 B2
(45) **Date of Patent: *Nov. 25, 2025**

(54) HAMMERMILL SYSTEM, HAMMER AND METHOD

(71) Applicant: Postle Industries, Inc., Cleveland, OH (US)

(72) Inventor: Robert F. Miller, Birmingham, AL (US)

(73) Assignee: Postle Industries, Inc., Cleveland, OH (US)

( * ) Notice: Subject to any disclaimer, the term of this patent is extended or adjusted under 35 U.S.C. 154(b) by 287 days.

This patent is subject to a terminal disclaimer.

(21) Appl. No.: 18/233,018

(22) Filed: Aug. 11, 2023

(65) Prior Publication Data

US 2023/0381786 A1 Nov. 30, 2023

Related U.S. Application Data

(63) Continuation of application No. 17/358,713, filed on Jun. 25, 2021, now Pat. No. 11,850,597, which is a continuation of application No. 14/525,739, filed on Oct. 28, 2014, now Pat. No. 11,045,813.

(60) Provisional application No. 61/896,657, filed on Oct. 28, 2013.

(51) Int. Cl.

| | |
|---|---|
| ***B02C 13/28*** | (2006.01) |
| ***B02C 13/04*** | (2006.01) |
| ***B22D 19/06*** | (2006.01) |

(52) U.S. Cl.

CPC .............. *B02C 13/28* (2013.01); *B02C 13/04* (2013.01); *B22D 19/06* (2013.01); *B02C 2013/2808* (2013.01)

(58) Field of Classification Search

CPC . B02C 13/04; B02C 13/28; B02C 2013/2808; B22D 19/06

See application file for complete search history.

(56) References Cited

U.S. PATENT DOCUMENTS

| | | | |
|---|---|---|---|
| 1,807,034 | A | 5/1931 | Hardinge |
| 1,835,701 | A | 12/1931 | Edmunds |
| 3,482,788 | A | 12/1969 | Newell |
| 3,492,101 | A | 1/1970 | Prill et al. |
| 3,672,516 | A | 6/1972 | Nordstrand |
| 3,738,586 | A | 6/1973 | Fabert, Jr. |
| 3,880,369 | A | 4/1975 | Kunstovny et al. |
| 3,918,649 | A | 11/1975 | Miller |
| 4,000,859 | A | 1/1977 | Whitney |
| 4,117,985 | A | 10/1978 | Lazareck |

(Continued)

*Primary Examiner* — Bobby Yeonjin Kim

(74) *Attorney, Agent, or Firm* — UB Greensfelder LLP; Brian E. Turung

(57) ABSTRACT

Various embodiments of a hammermill system, hammer, and methods are disclosed. A hammermill hammer comprises a metal composite comprising a plurality of inserts and a body portion disposed between each of the plurality of inserts. The composition of the plurality of inserts is different than composition of the body portion. The material of the plurality of inserts has a greater abrasion resistance than the material of the body portion and the material of the body portion has a greater impact resistance than the material of the inserts. The hammers produced have improved wear resistance and longer useful life compared to conventional hammermill hammers.

15 Claims, 10 Drawing Sheets

(56) References Cited

U.S. PATENT DOCUMENTS 4,141,512 A 2/1979 Francis
4,310,125 A 1/1982 Novotny
4,451,093 A 5/1984 Perez
4,504,019 A 3/1985 Newell et al.
4,558,826 A 12/1985 Martinek
4,650,129 A 3/1987 Newell et al.
4,716,643 A 1/1988 Berchem
5,002,233 A 3/1991 Williams
5,188,303 A 2/1993 Hoof
5,443,216 A 8/1995 Lojoie
5,490,637 A 2/1996 Golesis
5,676,496 A 10/1997 Littecke et al.
6,042,035 A 3/2000 Grobler et al.
6,066,407 A * 5/2000 Getz .................... E02F 9/2883 428/615
D426,556 S 6/2000 Bradley et al.
6,123,612 A 9/2000 Goers
6,171,713 B1 1/2001 Smith et al.
6,315,066 B1 11/2001 Dennis
6,399,176 B1 6/2002 Francois
6,527,210 B1 3/2003 Mecklenfeld
6,729,566 B2 5/2004 Giesedieck et al.
7,140,568 B2 11/2006 Greisedieck et al.
7,523,794 B2 * 4/2009 Hall ........................ B02C 2/005 175/426
7,717,365 B2 * 5/2010 Hall ....................... B28D 1/186 241/197
7,757,979 B2 7/2010 Stelk
7,823,632 B2 11/2010 McAfee et al.
8,308,094 B2 11/2012 Hoice et al.
8,651,407 B2 * 2/2014 Berton .................. B22D 19/14 241/291
8,999,518 B2 4/2015 Vescera
2006/0226269 A1 10/2006 Stelk
2007/0082217 A1 4/2007 Miller
2008/0041992 A1 * 2/2008 Hall ........................ B02C 13/09 241/189.1
2008/0041993 A1 2/2008 Hall et al.
2009/0250539 A1 10/2009 Stelk
2012/0067651 A1 3/2012 Xia et al.
2013/0233955 A1 * 9/2013 Morrow .................. B02C 13/28 241/189.1
2014/0151475 A1 6/2014 Graf et al.
2014/0353413 A1 12/2014 Plumb
2015/0115085 A1 4/2015 Miller

* cited by examiner

HAMMERMILL SYSTEM, HAMMER AND METHOD

RELATED APPLICATION

This patent application is a continuation of United Stated patent application Ser. No. 17/358,713 filed Jun. 25, 2021, which in turn is a continuation of U.S. patent application Ser. No. 14/525,739, filed Oct. 28, 2014, which in turn claims priority to U.S. Provisional Application Ser. No. 61/896,657 entitled "Hammermill System, Hammer and Method" filed on Oct. 28, 2013, all of which are incorporated by reference herein.

TECHNICAL FIELD

The present invention relates generally to hammermill systems and hammers used in the hammermill systems to crush objects.

BACKGROUND

The shredding of automobiles, household appliances and other metals is a process where a hammermill grinds the materials fed into it to small pieces, for example, fist-size pieces. Such shredding helps fulfill the large demand for quality scrap from steel mills. A drawback of current technology is that the material used to make hammers used in hammermills wears away rapidly and the hammers must be replaced frequently.

SUMMARY

In one embodiment of the present invention, a hammermill hammer comprises a metal composite comprising a plurality of metal inserts and a metal body portion disposed between each of the plurality of inserts. The composition of the plurality of inserts is different than composition of the body portion. In another embodiment, each of the plurality of inserts is made of a material that has a greater abrasion resistance than the material of the body portion, and the material of the body portion has a greater impact resistance than the material of each of the plurality of inserts. The hammers produced have improved wear resistance and longer useful life compared to conventional hammermill hammers.

BRIEF DESCRIPTION OF THE DRAWINGS

The various embodiments of the present invention can be understood with reference to the following drawings. The components in the drawings are not necessarily to scale. Also, in the drawings, like reference numerals designate corresponding parts throughout the several views.

DETAILED DESCRIPTION

Various embodiments of hammermills, hammers, and methods are disclosed herein. Particular embodiments of the invention will be described below with respect to the auto shredding industry, however, it will be appreciated that the present invention could be employed across a variety of industrial applications where abrasion resistance is needed.

Figure 1:
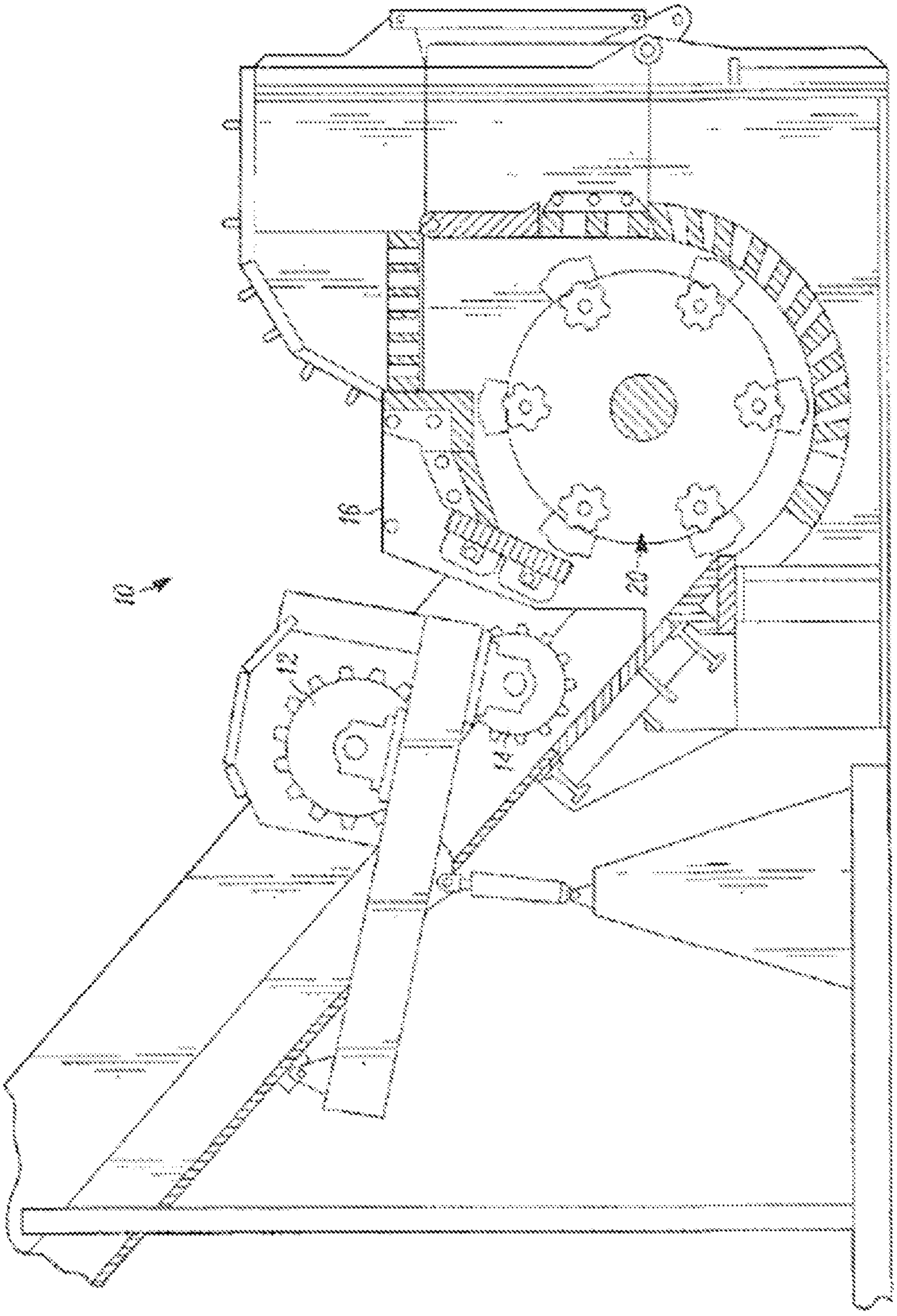
FIG. 1 is a schematic illustration of a side view of a hammermill system, according to an embodiment of the invention.
Figure 2:
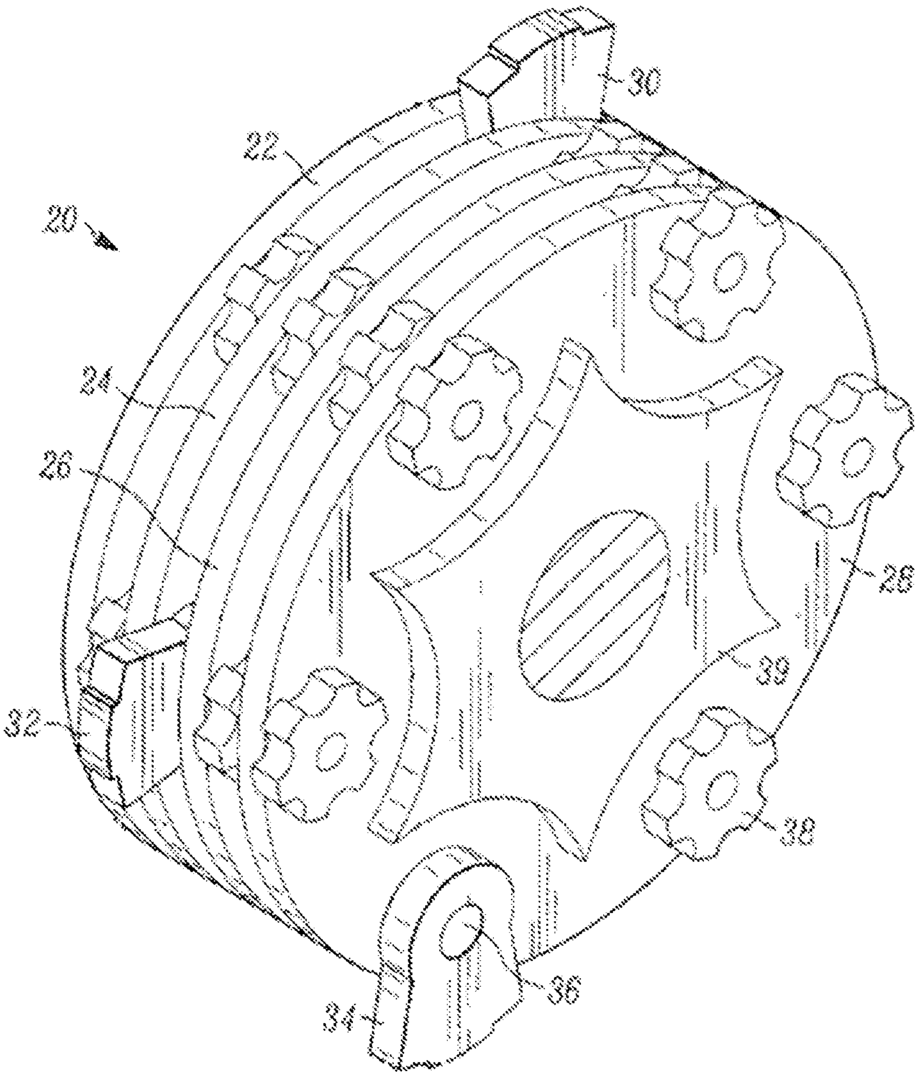
FIG. 2 is a schematic illustration of a rotor used in the hammermill system of FIG. 1 according to an embodiment of the present invention.

FIG. 1 is a schematic plan view illustration of a hammermill system 10, although alternative designs are possible. Items to be shredded can be conveyed by feed rollers 12 and 14 inside housing 16 and to rotor 20. FIG. 2 is a schematic illustration of rotor 20 used in the hammermill system of FIG. 1 according to an embodiment of the present invention. The hammermill system 10, for example, one that is used in auto shredding plant includes rotor 20 having a plurality of rotor disks such as rotor disks 22, 24, 26, and 28 and hammers 32, 34 and 36 attached thereto. The hammers are connected to rotor 20 through axils, also known as hammer pins 36. The hammers or pin protectors 38 are placed around the rotor in balanced positions about the rotor disks and around spacer 39. Several hammers, for example up to 36 hammers, can be added to a hammermill system depending on design and the manufacturer.

Figure 3:
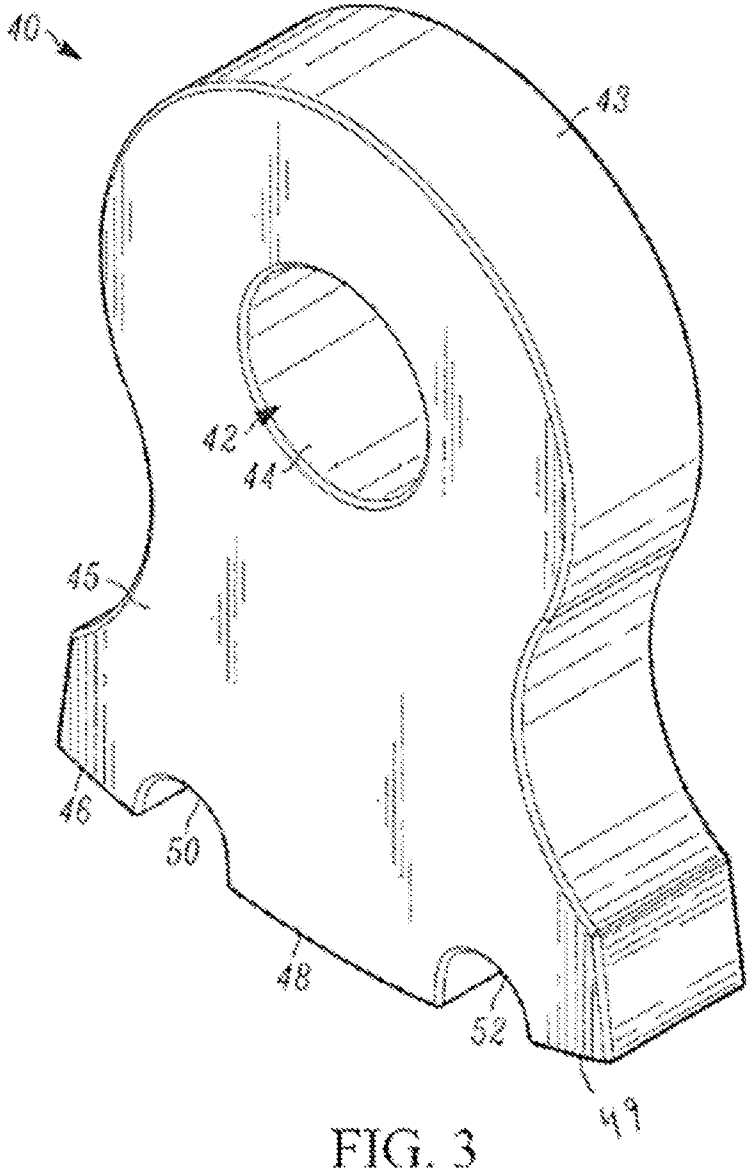
FIGS. 3 through 7 illustrate the perspective view, front view, top view, bottom view and side view of a hammer that may be used in the hammermill system of FIG. 1 and the rotor of FIG. 2, according to an embodiment of the present invention.

FIGS. 3 through 7 illustrate the perspective view, front view, top view, bottom view and side view of a hammer 40 that may be used in the hammermill system 10 of FIG. 1 and the rotor of FIG. 2, according to an embodiment of the present invention. The perspective view of FIG. 3 shows hammer 40 has an opening 42 with an internal wall surface 44 that is circular, so that the hammer may rotate easily about hammer pin 30 (FIG. 2). Wall 43 of hammer extends along top and sides of hammer and walls 46, 48, 49, 50 and 52 are bottom surfaces which are also wearing surfaces.

Figure 4:
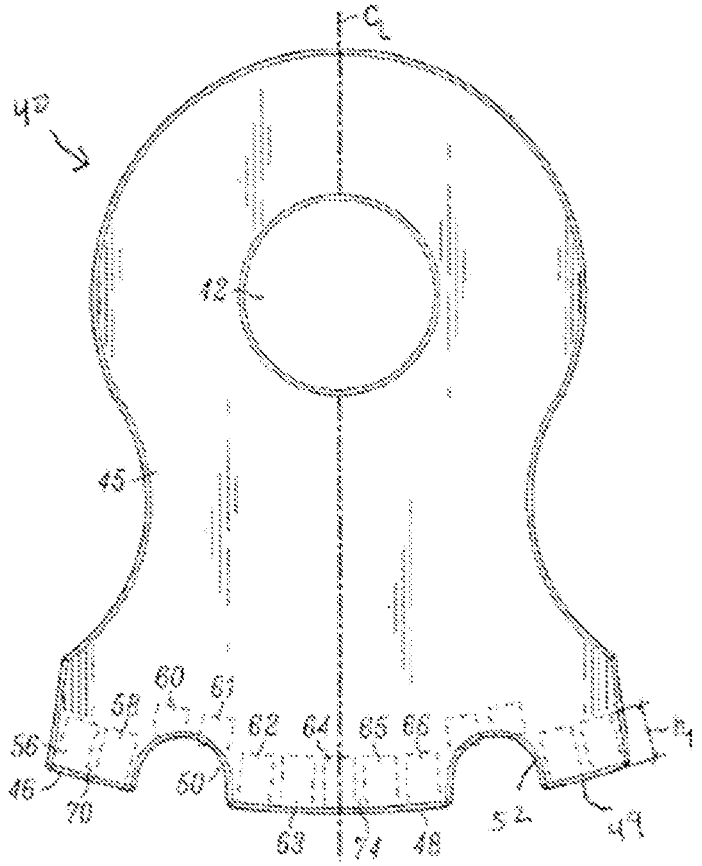
Figure 7:
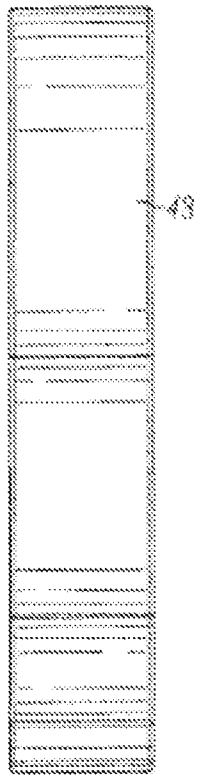
Figure 5:
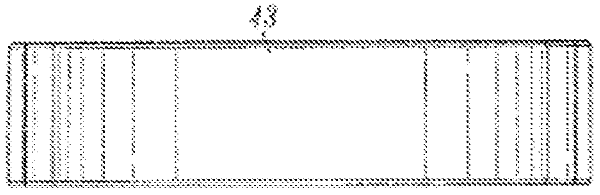

FIG. 4 shows the front view of hammer 40 and opening 42. Hammer 40 includes body portion 45 and a plurality of inserts 56, 58, 60, 61, 62, 63, 64, 65, and 66 which are shown in phantom. Body portion 45 extends between inserts as indicated by 70 and between inserts 56 and 58 and at 74 between inserts 64 and 65. Accordingly, in one embodiment, a metal composite includes a body portion 45 disposed between each of the plurality of inserts. The material composition of the surrounding body portion is different than the composition of each of the plurality of inserts. In one embodiment the material of each of the plurality of inserts has a greater abrasion resistance than the material of the body portion, and the material of the body portion has a greater impact resistance than each of the plurality of inserts. The inserts improve the abrasion resistance of the hammer while the impact resistance of the body portion disposed between the inserts absorbs the impact to the hammer during grinding. Not wishing to be bound by any particular theory, it has been found in accordance with the embodiments of the present invention herein, that the intermittent placement of the abrasion resistant insert material behaves more favorably than example large, solid blocks of insert material within the body portion of the hammer.

In another embodiment, the body portion surrounds each of the plurality of inserts in at least two dimensions. FIG. 3 also shows the plurality of inserts 56, 58, 60, 61, 62, 63, 64, 65, and 66 extend from inside the hammer 40 to an end surface along a wearing surface of the hammer, for example surfaces 46, 48, 49, 50 and 52. The inserts are shown as cylindrical in shape, although the inserts can be one of several shapes or a combination of shapes throughout the hammer. In another embodiment, for example the embodiment shown in FIG. 4, each of the plurality of inserts extends substantially perpendicular to a wearing surface of the hammer. Wearing surfaces 50 and 52 are arcuate and therefore, the inserts have a bottom surface that is also arcuate.

In another embodiment the inserts are located symmetrically about a central axis, CL, of the hammer. For example, an equal number of inserts are located to the left and the right of the center of the hammer. In another embodiment, an insert such as insert 64 may be located partially on the left side and partially on the right side of the hammer. In another embodiment, the combined weight of the plurality of inserts is equally distributed from the central axis of the hammer and the number of inserts may or not be equal in number on either side of the central axis.

Figure 6:
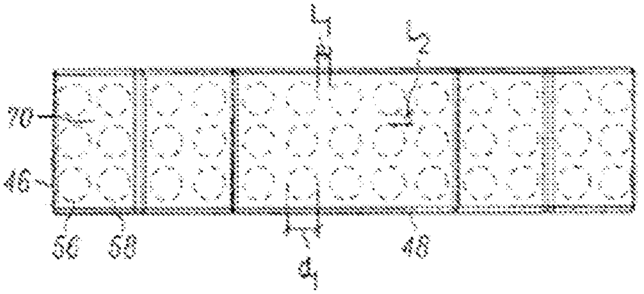
Figure 8:
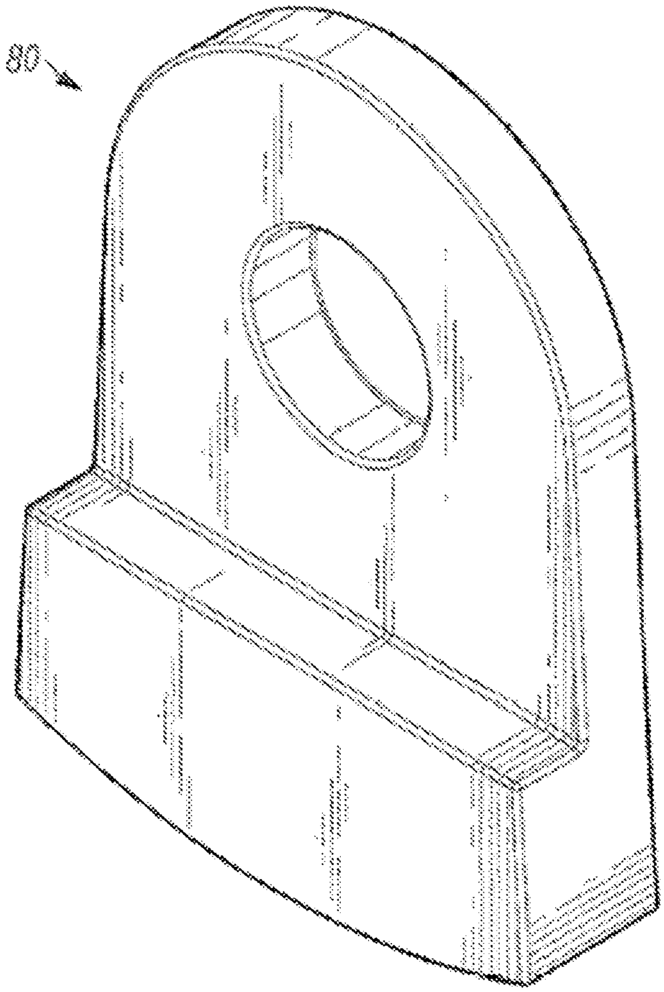
FIGS. 8 through 12 illustrate the perspective view, front view, top view, bottom view and side view of a hammer that may be used in the hammermill system of FIG. 1 and the rotor of FIG. 2, according to another embodiment of the present invention.
Figure 9:
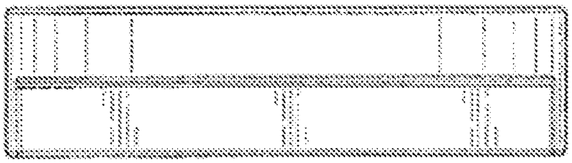
Figure 10:
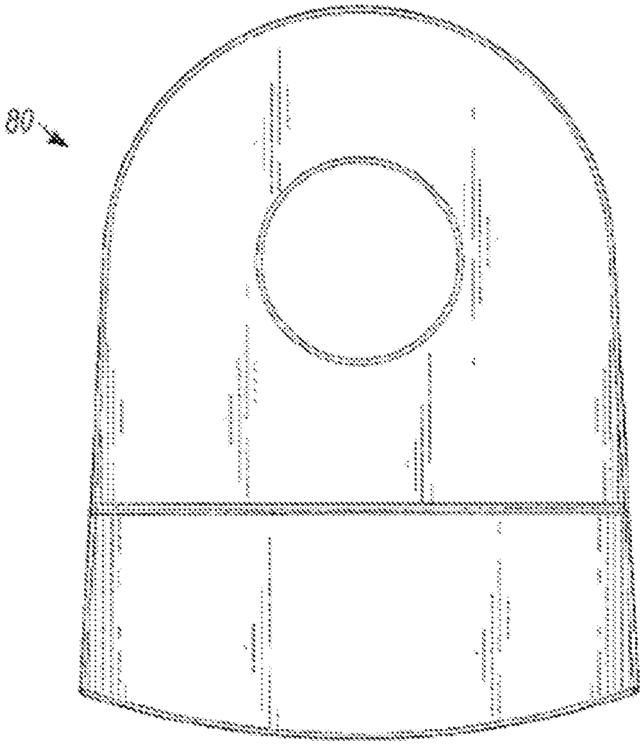
Figure 11:
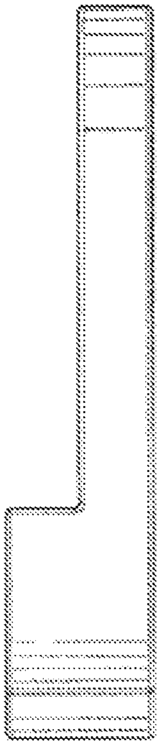
Figure 12:
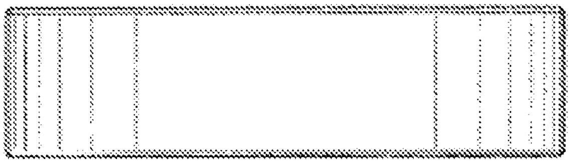
Figure 13:
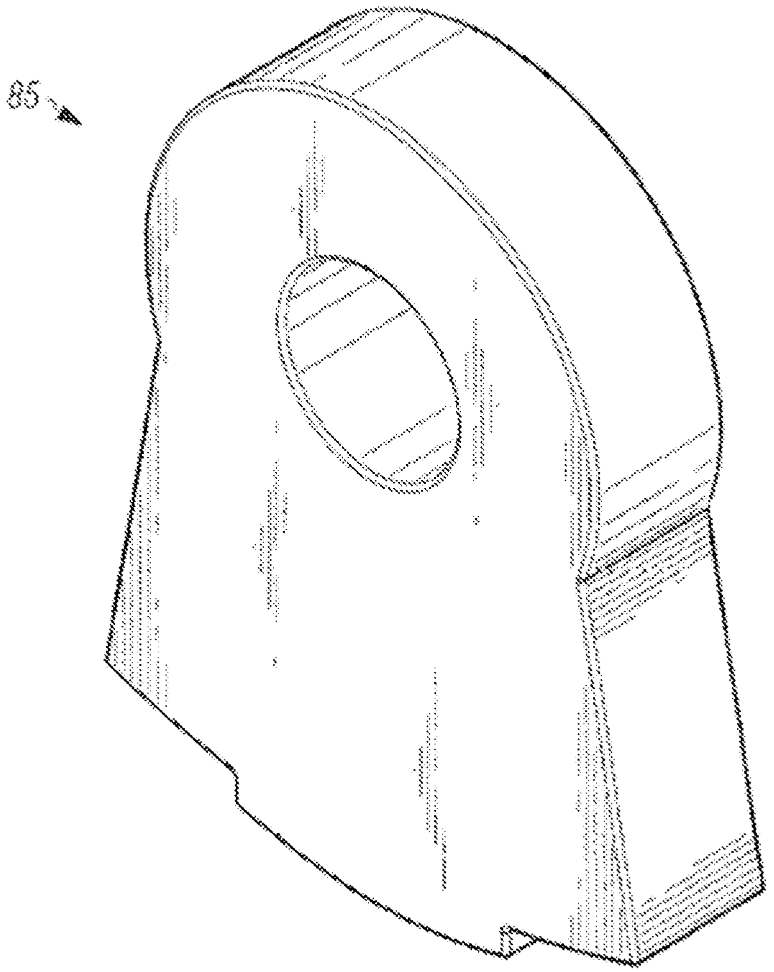
FIGS. 13 through 17 illustrate the perspective view, front view, top view, bottom view and side view of a hammer that may be used in the hammermill system of FIG. 1 and the rotor of FIG. 2, according to another embodiment of the present invention.
Figure 14:
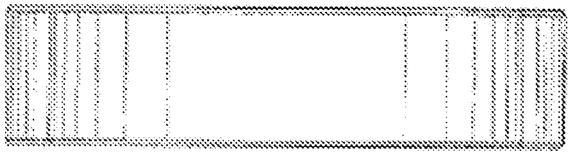
Figure 15:
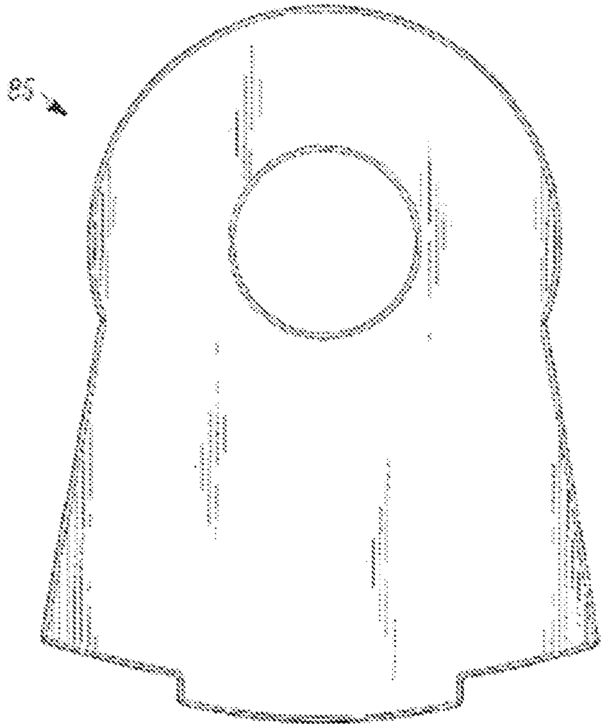
Figure 16:
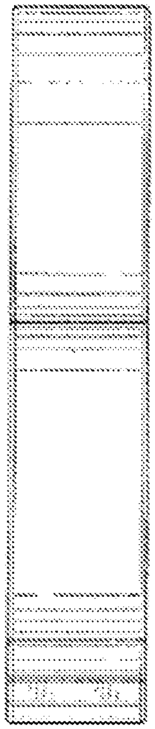
Figure 17:
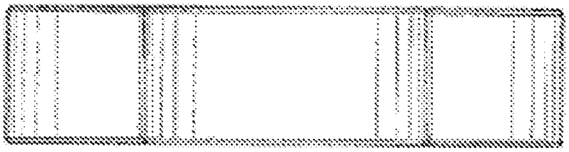
Figure 18:
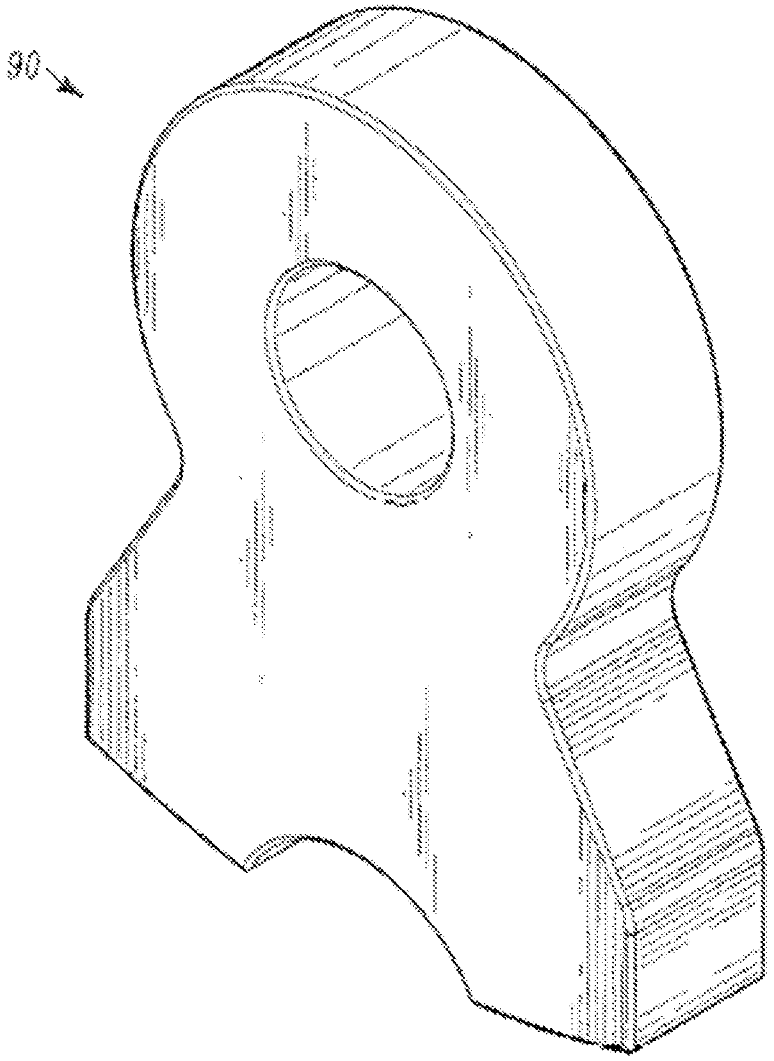
FIGS. 18 through 22 illustrate the perspective view, front view, top view, bottom view and side view of a hammer that may be used in the hammermill system of FIG. 1 and the rotor of FIG. 2, according to another embodiment of the present invention.
Figure 19:
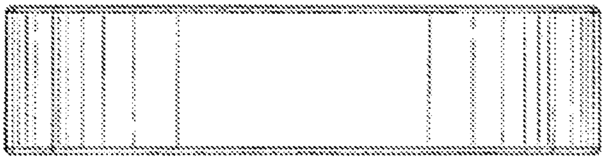
Figure 20:
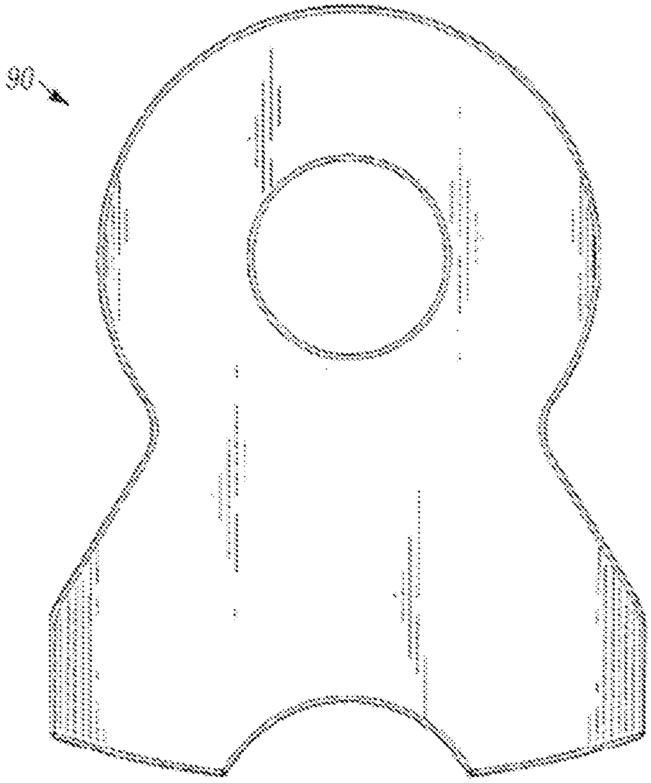
Figure 21:
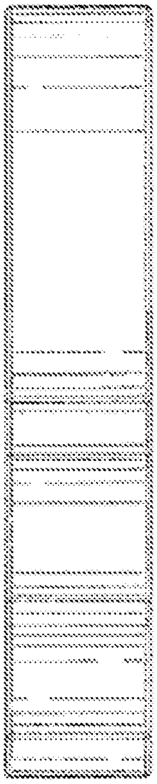
Figure 22:
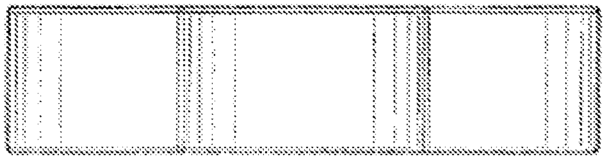

FIG. 6 is a bottom view of hammer 40 of FIG. 3 showing the bottom surfaces of the hammer and inserts. In one embodiment, the combined surface area of the end surface of the plurality of inserts 56, 58 represents from about 10% to about 90% of the wearing surface of the hammer, in another embodiment from about 20% to about 90%, in another embodiment from about 50% to about 90%, and in another embodiment from about 60% to about 80% of the wearing surface area of the hammer. This will vary from one hammer design to another. Hole diameters, placement and depth, can vary within the same hammer design, depending upon the wear pattern.

The spacing between the inserts, shown as L1 and L2, in FIG. 6, which is also dimensions of the body portion 70 between inserts, can vary depending upon several factors. For example, the spacing of the inserts 56 and 58 and others, can be depend on the surface area of the wearing surface of the hammer and/or the hammer design process. The diameter of the inserts can depend at least in part on the depth or height, shown as h1 in FIG. 4, of the insert. For example, in a process in which the insert material is welded to the body of the hammer, the "rib" of the body portion which is equal to the distance L1 and L2 between inserts should be sufficient to support welding of the insert material without burning through the rib of the body portion during the welding procedure, for example arc welding. Skip welding can be employed to ensure the heat is kept to a minimum and avoid burning through the body material. The composition of the material used as the base portion of hammer is also a factor. The openings in the body portion for inserts can be casted or made by drilling. If the inserts are deposited into cavities openings along the wear surface of the hammer.

The amount of wear desired, and the extended life, is also a factor in the size (e.g., diameter) and depth or height of the inserts. In one example embodiment the distance or length, L1 and L2 between the inserts can range from about 0.025" to about 2", in another embodiment from about 0.025" to about 1." The depth or height of the inserts can range from about ½" to 4" and in another embodiment from about 1" to 4", and the diameter of the cavity can range from about ½" to about 3" and in another embodiment from about 1" to about 2.".

As mentioned above with respect to the hammermill system 10 and hammer 40, the number, location and size or mass of the inserts can achieve balance and even wear. The various design geometries of the hammer will exhibit different wear patterns, and each design can require a custom insert design. The inserts may also vary in shape and size in the same hammer. The hammers can be rotated to compensate for uneven wear and to achieve a longer wear life.

Several material compositions can make up the body portion of the hammer. In one example embodiment the volume of material of the body portion is greater than the volume of material of the plurality of inserts, and in another embodiment, the volume of the material of the body portion is at least about 50% of the volume of the hammer. As mentioned above, the material of the body portion has greater impact resistance than the material of the inserts. In one embodiment the material of the body portion includes metal. In another embodiment, the material of the body portion includes, but is not limited to, metal, ceramic, polymers, and mixtures thereof. Example materials that can make up the body portion of the hammer include but are not limited to, the "Hadfield" manganese alloys. The Hadfield materials are abrasion resistant and can achieve up to three times its surface hardness during conditions of impact, without any increase in brittleness. Accordingly, in one embodiment the body portion of a hammer comprises a manganese alloy that comprises, by weight, from about 11% to about 20% manganese and from about 1% to about 1.3% carbon. In another embodiment the manganese alloy comprises iron. A typical composition of a Hadfield alloy is shown in Table 1. Calcium and molybdenum are optional elements that can be added.

TABLE 1

| Elemental Compositions, Weight Percent | | | | | | |
|---|---|---|---|---|---|---|
| C | Mn | Si | P | Ni | S | Fe/Others |
| 1.0-1.3 | 11.0-20.0 | 1.0 max | 0.07 max | 1.0-5.0 | 0.04 max | Balance |

Several material compositions can make up the plurality of inserts of the hammer. As mentioned above, the material of the inserts has greater abrasion resistance than the material of the body portion of the hammer. In one embodiment the material of the body inserts includes metal. In another embodiment, the material of the inserts includes, but is not limited to, metal, ceramic, polymers, and mixtures thereof. The composition of the individual inserts of the same hammer can be the same or different. In one embodiment the material of each of the inserts exhibits has a weight loss of less than 0.4 gram, and in another embodiment, exhibits a weight loss that ranges from about 0.1 gram to about 0.4 gram, according to ASTM G65 Wear Testing.

In another embodiment, the material of the insert has an abrasion resistance that is at least about three times greater, in another embodiment at least about five times greater, and in another embodiment about ten times greater than the abrasion resistance of material of the body portion, wherein abrasion is measured according to ASTM G65 Wear Testing. Example materials for the inserts include, but are not limited to, a material selected from the group of: manganese, chromium, molybdenum, titanium, tungsten, vanadium, niobium, and boron. In another embodiment the material of the insert includes, but is not limited to metal carbides of Cb, Va, Mo, Ti encapsulated on a martensitic structure.

FIGS. 8 through 12 illustrate the perspective view, front view, top view, bottom view and side view of a hammer that may be used in the hammermill system of FIG. 1 and the rotor of FIG. 2, according to another embodiment of the present invention.

FIGS. 13 through 17 illustrate the perspective view, front view, top view, bottom view and side view of a hammer that may be used in the hammermill system of FIG. 1 and the rotor of FIG. 2, according to another embodiment of the present invention.

FIGS. 18 through 22 illustrate the perspective view, front view, top view, bottom view and side view of a hammer that may be used in the hammermill system of FIG. 1 and the rotor of FIG. 2, according to another embodiment of the present invention.

Accordingly, hammermill system 10 can include any of the hammers described above with respect to FIGS. 2 through 22. In one embodiment hammermill system 10 includes a rotor, a plurality of hammermill hammers in physical communication with a rotor 20 which rotates about an axis. Each of the plurality of hammers is a composite comprising a metal body portion disposed between each of a plurality of inserts. The material composition of the metal body portion is different than the material composition of the plurality of inserts. In one embodiment, the material of the plurality of inserts has a greater abrasion resistance than the material of the body portion, and the body portion has a greater impact resistance than the material of the plurality of inserts. In another embodiment, the body portion of the hammer surrounds each of the plurality of insert in at least two dimensions.

A method of making a hammermill hammer includes forming a body portion comprising a plurality of voids with a first material to produce a cast body; placing a second material into the voids of the cast body; and solidifying the second material to produce a hammer such that the resulting hammer is a composite comprising a plurality of metal inserts and a metal body portion disposed between each of the plurality of inserts. In another embodiment, a method of making the hammermill hammer includes forming voids in a body of a first material, placing inserts of a second material that is different than the first material into the voids, and welding the inserts to the body by a welding process, for example arc welding. The material of the plurality of inserts has a greater abrasion resistance than the material of the body portion, and the material of the body portion has a greater impact resistance than the material of the plurality of inserts. In another aspect, the hammer produced by the above method has a body portion that surrounds each of the plurality of inserts in at least two dimensions. In another embodiment, at least one of the plurality of inserts extends from inside the hammer to an end surface along a wearing surface of the hammer.

It will be appreciated that the hammers produced in accordance with the embodiments of the present invention have a microstructure and composition that enhances service life of and performance in hammermills used across a wide variety of industries, including but not limited to, the automotive industry. Such an improvement in abrasive wear resistance is demonstrated in a longer useful life of the hammer.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A hammermill hammer comprising a metal body and a plurality of metal inserts; said metal body has a top end and a bottom end; said bottom end has an outer peripheral edge; said bottom end includes a plurality of cavities that are spaced from one another and are spaced from said outer peripheral edge of said bottom end; said plurality of cavities includes first and second cavities; said plurality of metal inserts includes first and second metal inserts; a majority of a longitudinal length of said first metal insert positioned in said first cavity; a majority of a longitudinal length of said second metal insert positioned in said second cavity; a bottom surface of said plurality of metal inserts forms a portion of a wearing surface of said hammermill hammer; said first metal insert is welded in first cavity to secure said first metal insert in first cavity; said second metal insert is welded in second cavity to secure said second metal insert in second cavity; a material composition of said metal body is different from a material composition of said first and second metal inserts; said material composition of said first and second metal inserts has a greater abrasion resistance than said material composition of the metal body; at least one of said first and second metal inserts is at least partially formed of a) one or more metals selected from the group consisting of manganese, chromium, molybdenum, titanium, vanadium, niobium, and boron, or b) one or more metal carbides selected from the group of molybdenum, niobium, vanadium and titanium, wherein said material composition of said metal body has a greater impact resistance said material composition of at least one of said first and second metal inserts.

2. The hammermill hammer as defined in claim 1, wherein said metal body has a central longitudinal axis that extends along a longitudinal length of said metal body from said top end to said bottom end of said metal body; said first cavity has a first cavity longitudinal axis that is parallel to said central longitudinal axis.

3. The hammermill hammer as defined in claim 2, wherein said second cavity has a second cavity longitudinal axis that is non-parallel to said central longitudinal axis and non-parallel to said first cavity longitudinal axis.

4. The hammermill hammer as defined in claim 1, wherein said material composition of said metal body includes carbon and iron.

5. The hammermill hammer as defined in claim 3, wherein said material composition of said metal body includes carbon and iron.

6. The hammermill hammer as defined in claim 1, wherein a combined surface area of a bottom surface of said plurality of metal inserts represents 50-90% of a surface area of said bottom end of said hammermill hammer.

7. The hammermill hammer as defined in claim 5, wherein a combined surface area of a bottom surface of said plurality of metal inserts represents 50-90% of a surface area of said bottom end of said hammermill hammer.

8. The hammermill hammer as defined in claim 1, wherein a combined weight of said plurality of metal inserts is equally distributed about said longitudinal central axis of said metal body.

9. The hammermill hammer as defined in claim 7, wherein a combined weight of said plurality of metal inserts is equally distributed about said longitudinal central axis of said metal body.

10. A hammermill system comprising:

a rotor;

a plurality of hammermill hammers that rotate about said rotor along an axis; each of said hammermill hammers comprising a metal body and a plurality of metal inserts; said metal body has a top end and a bottom end; said bottom end has an outer peripheral edge; said bottom end includes a plurality of cavities that are spaced from one another and are spaced from said outer peripheral edge of said bottom end; said plurality of cavities includes first and second cavities; said plurality of metal inserts includes first and second metal inserts; a majority of a longitudinal length of said first metal insert positioned in said first cavity; a majority of a longitudinal length of said second metal insert positioned in said second cavity; a bottom surface of said plurality of metal inserts forms a portion of a wearing surface of said hammermill hammer; said first metal insert is welded in first cavity to secure said first metal insert in first cavity; said second metal insert is welded in second cavity to secure said second metal insert in second cavity; a material composition of said metal body is different from a material composition of said first and second metal inserts; said material composition of said first and second metal inserts has a greater abrasion resistance than said material composition of the metal body; at least one of said first and second metal inserts is at least partially formed of a) one or more metals selected from the group consisting of manganese, chromium, molybdenum, titanium, vanadium, niobium, and boron, or b) one or more metal carbides selected from the group of molybdenum, niobium, vanadium and titanium, wherein said material composition of said metal body has a greater impact resistance said material composition of at least one of said first and second metal inserts.

11. A method of making a hammermill hammer system comprising:

forming a hammer for use in said hammermill hammer system; said hammer including a hammer body formed of a first metal composition; said hammer body has a top end and a bottom end and a central longitudinal axis that extends from said top end to said bottom end; said bottom end has an outer peripheral edge; said bottom end includes a plurality of insert cavities that are spaced from one another and are spaced from said outer peripheral edge of said bottom end;

placing a second metal composition into each insert cavity of said plurality of insert cavities to form plurality of metal insert wherein each metal insert position in each of said insert cavities; said second metal composition having a different composition from said first metal composition; said second metal composition having a greater abrasion resistance than said first metal composition; said first metal composition having a greater impact resistance than said second metal composition; said second metal composition at least partially formed of a) one or more metals selected from the group consisting of manganese, chromium, molybdenum, titanium, vanadium, niobium, and boron, or b) one or more metal carbides selected from the group of molybdenum, niobium, vanadium and titanium; wherein said material composition of said metal body has a greater impact resistance said material composition of at least one of said first and second metal inserts;

securing said second metal composition in each of said insert cavities by a welding process; and, securing said hammer to said hammermill hammer system.

12. The method as defined in claim 11, wherein said hammer body has a central longitudinal axis that extends along a longitudinal length of said hammer body from said top end to said bottom end of said hammer body; said plurality of insert cavities includes a first insert cavity that has a first cavity longitudinal axis that is parallel to said central longitudinal axis of said hammer body.

13. The method as defined in claim 12, wherein said plurality of insert cavities includes a second insert cavity that has a second insert longitudinal axis that is non-parallel to said central longitudinal axis of said hammer body and is also non-parallel to said first cavity longitudinal axis.

14. The method as defined in claim 11, wherein a combined surface area of a bottom surface of said plurality of metal inserts represents 50-90% of a surface area of said bottom end of said hammer body.

15. The method as defined in claim 13, wherein a combined surface area of a bottom surface of said plurality of metal inserts represents 50-90% of a surface area of said bottom end of said hammer body.

* * * * *